(12) United States Patent
Scaife

(10) Patent No.: US 11,253,804 B2
(45) Date of Patent: Feb. 22, 2022

(54) APPARATUS AND METHOD TO CLEAN PARTICLE LOADED FLUID USING LOW ENERGY MULTI-FLOW SPLITTER TECHNOLOGY REQUIRING NO FILTER MEDIA

(71) Applicant: MOBIAIR PET. LTD., Amazana (SG)

(72) Inventor: Martin Scaife, Singapore (SG)

(73) Assignee: MOBIAIR PTE. LTD., Amazana (SG)

(*) Notice: Subject to any disclaimer, the term of this patent is extended or adjusted under 35 U.S.C. 154(b) by 0 days.

(21) Appl. No.: 17/265,109

(22) PCT Filed: May 27, 2019

(86) PCT No.: PCT/SG2019/050275
§ 371 (c)(1),
(2) Date: Feb. 1, 2021

(87) PCT Pub. No.: WO2019/231398
PCT Pub. Date: Dec. 5, 2019

(65) Prior Publication Data
US 2021/0316241 A1 Oct. 14, 2021

(30) Foreign Application Priority Data
Jun. 1, 2018 (SG) .............................. 10201804693U

(51) Int. Cl.
*B01D 46/46* (2006.01)
*B01D 45/16* (2006.01)
(Continued)

(52) U.S. Cl.
CPC ................. *B01D 45/16* (2013.01); *B04C 1/00* (2013.01); *B01D 21/265* (2013.01);
(Continued)

(58) Field of Classification Search
CPC .. B01D 45/16; B01D 21/265; B01D 2221/10; B04C 1/00; B04C 2009/005; B07B 7/086; B01L 3/502761
See application file for complete search history.

(56) References Cited

U.S. PATENT DOCUMENTS 1,600,762 A * 9/1926 Hawley ..................... B04C 1/00
95/268
2,290,664 A * 7/1942 Allardice .................. B04C 1/00
55/398
(Continued)

*Primary Examiner* — Dung H Bui
(74) *Attorney, Agent, or Firm* — Jordan IP Law, LLC

(57) ABSTRACT

The present invention relates to an apparatus and a method of cleaning particle loaded "dirty" air using a multi flow-splitter technology in combination with at least one cyclone system which requires minimal energy to operate due to low pressure drops used to generate the fluid flows whilst allowing to exert high centrifugal or G-Force on the infeed fluid stream. This further allows to operate the particle removal process such that conventional additional filter media become optional, such that the technology may operate a significantly reduced or even without the need for maintenance and/or repair. Low internal air turbulence ensures a very high separation efficiency. Optionally adding additional explosion safe low-energy down-stream filtration stages with variable speed system fan provides optimal operational performance and operational flexibility.

14 Claims, 11 Drawing Sheets

(51) Int. Cl.
  *B04C 1/00* (2006.01)
  *B04C 9/00* (2006.01)
  *B01D 21/26* (2006.01)
  *B07B 7/086* (2006.01)
  *B01L 3/00* (2006.01)

(52) U.S. Cl.
  CPC ..... *B01D 2221/10* (2013.01); *B01L 3/502761* (2013.01); *B04C 2009/005* (2013.01); *B07B 7/086* (2013.01)

(56) References Cited

U.S. PATENT DOCUMENTS

| | | | | |
|---|---|---|---|---|
| 3,031,825 A * | 5/1962 | Fourniere | B04C 9/00 | 96/303 |
| 3,326,641 A * | 6/1967 | Audran | G03C 1/015 | 23/305 R |
| 3,346,117 A * | 10/1967 | Page, Jr. | E21B 43/34 | 210/304 |
| 3,523,864 A * | 8/1970 | Klei, Jr. | D21C 11/0092 | 423/183 |
| 3,710,561 A * | 1/1973 | Garrone | B01D 45/16 | 55/429 |
| 3,789,582 A * | 2/1974 | Graybill | B01D 45/16 | 96/17 |
| 3,907,671 A * | 9/1975 | Baigas, Jr. | B04C 5/081 | 209/722 |
| 3,951,813 A * | 4/1976 | Palma | B01D 43/00 | 210/374 |
| 4,343,707 A * | 8/1982 | Lucas | B01D 21/26 | 210/695 |
| 4,375,365 A * | 3/1983 | Muller | B01D 45/12 | 209/723 |
| 4,801,310 A * | 1/1989 | Bielefeldt | B01D 17/0217 | 209/60 |
| 4,927,437 A * | 5/1990 | Richerson | B01D 45/16 | 55/349 |
| 5,004,552 A * | 4/1991 | Al-Yazdi | B01D 17/0208 | 210/789 |
| 5,093,006 A * | 3/1992 | Kalnins | B01D 17/0202 | 210/704 |
| 5,248,421 A * | 9/1993 | Robertson | B01D 17/0217 | 209/723 |
| 5,269,637 A * | 12/1993 | Gomes, Jr. | B04C 1/00 | 209/722 |
| 6,371,126 B1 * | 4/2002 | Korte | A24C 5/39 | 131/110 |
| 6,569,323 B1 * | 5/2003 | Pribytkov | B01D 21/265 | 210/181 |
| 6,896,720 B1 * | 5/2005 | Arnold | A47L 9/1608 | 55/394 |
| 7,314,559 B2 * | 1/2008 | Hopper | B01D 21/10 | 210/512.1 |
| 7,363,982 B2 * | 4/2008 | Hopper | B01D 19/0042 | 166/357 |
| 7,527,675 B2 * | 5/2009 | Bertuccioli | B03C 3/017 | 96/61 |
| 7,615,107 B2 * | 11/2009 | Burlatsky | B01D 53/10 | 96/116 |
| 10,040,025 B2 * | 8/2018 | Ujino | B01D 53/323 | |
| 10,189,028 B2 * | 1/2019 | Convery | B03B 9/00 | |
| 2009/0014360 A1 * | 1/2009 | Toner | B01D 45/12 | 209/208 |
| 2009/0283483 A1 * | 11/2009 | Achard | B01D 21/26 | 210/802 |
| 2012/0077267 A1 * | 3/2012 | Lee | B03C 1/02 | 435/325 |
| 2013/0025455 A1 * | 1/2013 | Morrison | B01D 53/24 | 95/270 |
| 2013/0082012 A1 * | 4/2013 | Lean | B01D 21/02 | 210/804 |
| 2016/0038867 A1 * | 2/2016 | Kim | B01D 53/86 | 55/428 |
| 2016/0145122 A1 * | 5/2016 | Wilson | C02F 1/048 | 203/10 |
| 2017/0354908 A1 * | 12/2017 | Prasad | B01D 45/12 | |
| 2018/0280837 A1 * | 10/2018 | Madmoni | B01D 21/245 | |
| 2018/0369807 A1 * | 12/2018 | Rezai | B01L 3/50273 | |
| 2019/0282976 A1 * | 9/2019 | Pukkella | B01F 5/0647 | |
| 2020/0016516 A1 * | 1/2020 | Madmoni | B01L 3/502753 | |

* cited by examiner

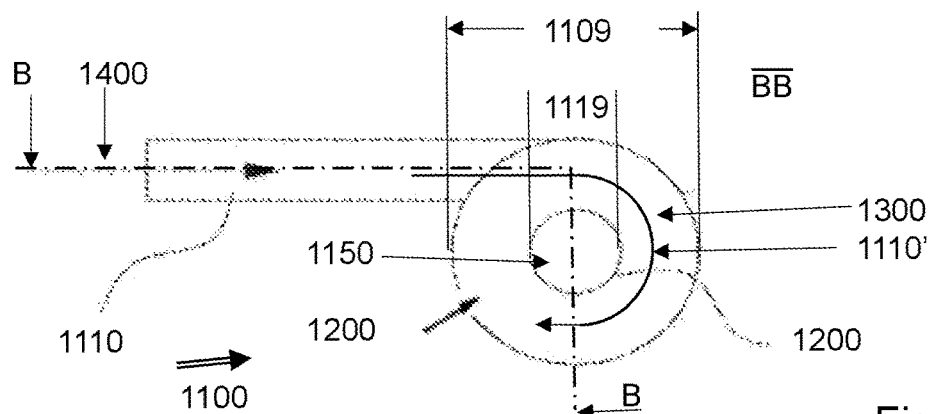
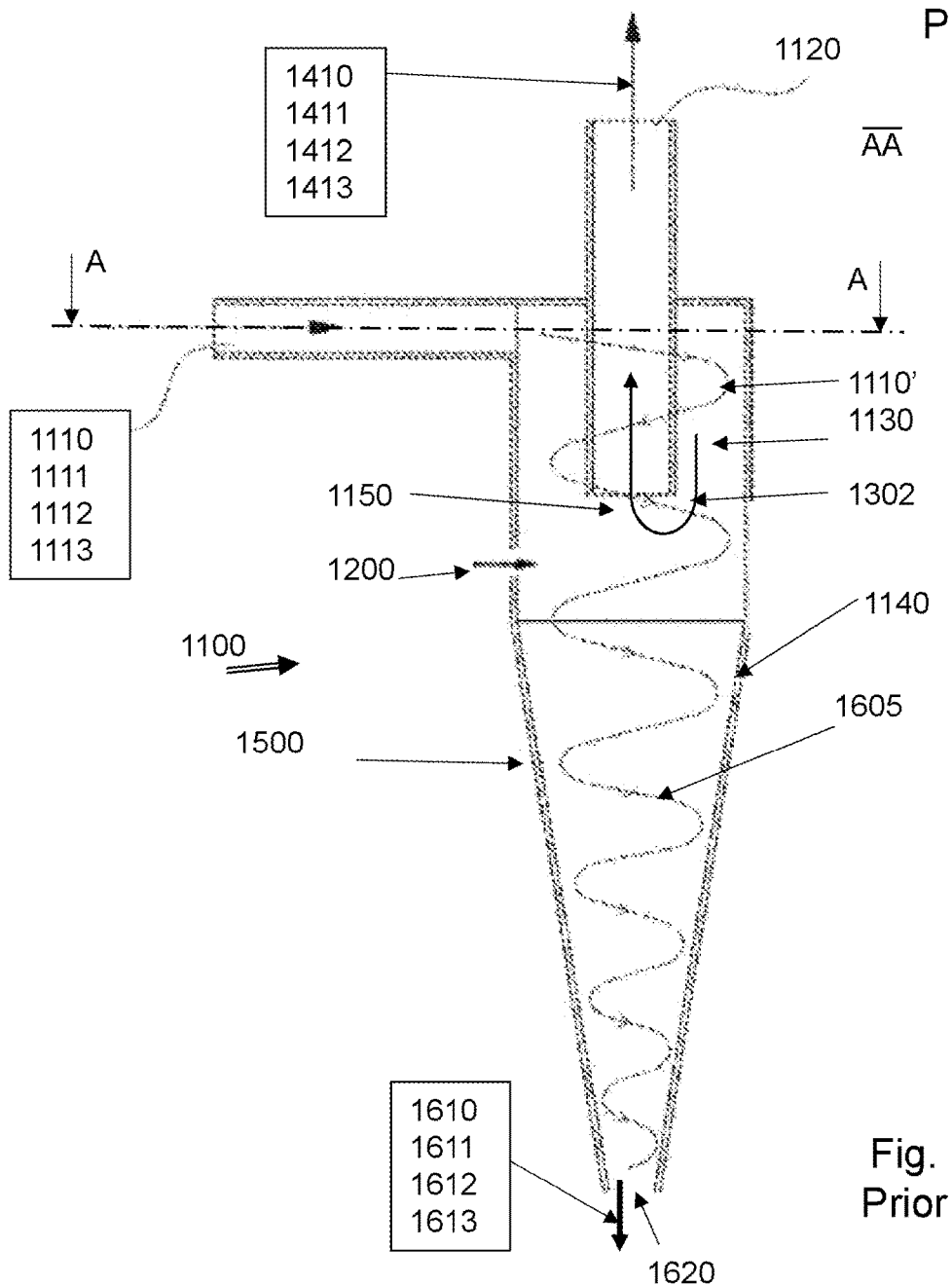
Fig. 1A
Prior Art
Fig. 1B
Prior Art

5010

APPARATUS AND METHOD TO CLEAN PARTICLE LOADED FLUID USING LOW ENERGY MULTI-FLOW SPLITTER TECHNOLOGY REQUIRING NO FILTER MEDIA

CROSS-REFERENCE TO RELATED APPLICATIONS

The present application is a National Stage Application of PCT International Application No. PCT/SG2019/050275 (filed on May 27, 2019), under 35 U.S.C. § 371, which claims priority to Singapore Patent Application No. SG10201804693U (filed on Jun. 1, 2018), which are each hereby incorporated by reference in their complete respective entireties.

FIELD OF THE INVENTION

The present invention relates to an apparatus and a method of cleaning particle loaded or "dirty" fluid by removing particles therefrom using a multi flow-splitter technology in combination with at least one cyclone system. The new technology requires minimal energy to operate due to low pressure drops used to generate the rotation of the fluid whilst exerting high centrifugal (or "G-") Force on the incoming fluid stream. Operating without the need for conventional filter media, the technology operates also with a significantly reduced, if not fully eliminated need for maintenance and/or repair. Low internal fluid turbulence ensures a very high separation efficiency. Additional explosion safe low-energy down-stream cleaning stages, preferably with variable speed system fan, provides optimal operational performance and operational flexibility.

BACKGROUND OF THE INVENTION

Cyclonic separators have been in existence for over a century with patents filed as early as 1920. This cyclone separation process is a simple and reliable process used to separate particles from a particle loaded contaminated fluid-stream, such as air or water. In a typical cyclone, the fluid flows in a helical pattern or vortex, beginning at the wide (typically top) end of the cyclone which has a narrowing diameter towards the opposite end (typically the bottom). The main portion of the fluid, if not essentially all, exits the cyclone through a straight central pipe in the wide portion, typically at the top. The heavier particles carried within the incoming fluid-stream are forced to the outside of the vortex flow pattern and towards the outer wall of the cyclone by the centrifugal force created by the rotating fluid-stream. With the heavier particles now on the outside of the vortex, these particles touch the outer walls of the system body and with resulting friction these particles slow down and eventually fall out of the fluid stream whilst cleaner fluid is removed from the center of the vortex. Over time, thousands of process enhancements have been described and implemented. These enhancements typically related to cyclone diameters, internal geometries, arrangement of multiple cyclones, or by adding various vibrating mechanisms within the system (see e.g., EP2587980, Dyson). The majority of these enhancements aimed at reduced energy consumption and/or higher separation performances. Higher separation performances are typically achieved by increasing G-Force and/or reducing internal turbulence and/or increasing internal dwell time. Reducing energy consumption is typically carried out by reducing the pressure drop created across the cyclone, which directly saved main system fan or pump power savings. Such savings are significant as world-wide millions of cyclones are in operation. The grain handling sector for instance has spent significant effort to reduce energy consumption, as just a 1-2% energy drop can save the grain handling sector millions of dollars in energy savings.

Despite this R&D effort over the past century the overall design and process functionality of typical cyclonic separators have remain unchanged. Typically, fluid enters the cyclone at the top, mostly from the side, a helical vortex is created, separated particles are removed from the base of the outlet funnel of the cyclone body and cleaned fluid is removed from the top center of the cyclone. Although functional, cyclonic separators require significant energy to operate when compared to other filtration systems such as with filter media, like bag-houses, and as such are not used in multiple applications across multiple industries. For example, when considering an air separator cyclone, pressure drops across a cyclone often range from about 500 to 1500 Pa (2-6 inches of water gauge) meaning high powered main system fans are needed to keep the cyclone running. In the nuclear industry where a higher G-Force is needed, pressure drop can go far beyond 5000 Pa (20 inches of water gauge).

Also, whilst traditional cyclonic separators are functional, their separation performance is not ideal and, e.g., as often seen for air separators, smaller particles typically below 10 µm are particularly affected by turbulence in the lower portion of the cyclone process, causing disturbance to the particle flow which then cause these smaller particles to break away from the particle loaded ("dirty") stream exiting the base of the funnel and instead to exit the process through the clean fluid stream.

On the positive side, traditional cyclonic separators have a huge advantage in that filter media is indeed not required and the technology often operates with low or even zero maintenance and repair costs. Furthermore, cyclonic separators can also handle both elevated as well as very low temperatures which other separators like bag-houses and drum filters often cannot process.

It is also known to connect multiple cyclones, wherein the outlet of a primary cyclone is sequentially connected to several parallel secondary cyclones, see e.g. WO2017173542A1.

Thus, there is still a need for an efficient separation process, which operates at higher centrifugal (G-) force (smaller diameter). Furthermore, in particular for air separation processes the separation efficiency especially for smaller particles should be increased by reducing or eliminating turbulence within the cyclone, thus allowing particles below 10 microns to remain stable during the separation process. Also, there is a need for the energy consumption to be reduced.

As an alternative to cyclones, it is also known to separate particles from a gas stream in an apparatus also referred to as an air splitter, such as described in EP2334407A1, relating to the flue gases of power plants or incineration units. As described therein, a "dirty", particle loaded gas stream is submitted to a centrifugal movement, whereby the particles are moved towards the outward region of a splitter equipment and the separated in a side stream from the main stream. This technology is capable of providing the main air stream with only a low particle load, and avoids—in comparison to a cyclone—the energy consuming re-directing of the main air stream. However, the "dirt" loaded air stream still requires a further treatment step to remove the particles as it exhibits a relatively high air to particle load ratio. In EP2334407, this is achieved by a spray dryer absorption apparatus.

Thus the object of the present invention is to overcome the limitations of the cyclone as well of the flow splitter technologies by combining multiple units of the latter with a cyclone into an easy to operate, low energy consuming process which negates the need to change direction of the main fluid streams of a cyclone and may thus result in a significant energy reduction, such as for example of up to 70% versus conventional cyclonic-only separators.

SUMMARY OF THE INVENTION

Thus, the present invention is a method for removing particles from a particle loaded fluid stream, the method comprising the following process steps:
  a. providing at least one, preferably a multiplicity of curved preferably circular duct system, optionally comprising more than one turn;
  b. providing a particle loaded fluid stream;
  c. feeding the particle loaded fluid stream into the curved duct system;
  d. deflecting the fluid stream in the duct system in a rotational movement;
  e. maintaining the rotational movement of the particle loaded fluid stream for a dwell time allowing particles of the particle loaded fluid stream to accumulate radially outwardly in the rotary fluid stream;
  f. splitting the outward portion of the rotary fluid stream from the inner portion of the rotary fluid stream through a dividing object, preferably a splitter blade, which may be fixed or adjustable, whereby the outward portion of the rotary fluid stream has a higher particle load compared to the inner portion of the rotary fluid stream;
  g. expelling the inner rotary fluid stream as a particle depleted fluid stream through a first exit and duct for a particle depleted fluid stream and expelling the outer rotary fluid stream as a particle enriched fluid stream through a second exit and duct for a particle enriched fluid stream wherein both the inner rotary fluid stream duct and the outer rotary fluid stream duct are separated.
  h. directing the particle enriched fluid stream to a cyclone separator to further separate it into further enriched and further depleted particle stream, respectively The method may further comprise one or more of the process steps selected from the group consisting of
  i. providing a multiplicity of the curved duct systems, positioning in series or in parallel;
  j. connecting multiple inlet feeds into a common fluid flow balancing void space to ensure that inlet pressures across multiple duct systems are similar or essentially the same;
  k. connecting multiple outlet feeds into a common duct system outlet fluid stream;
  l. connecting multiple outlet feeds into a common duct system outlet fluid stream and connecting this to a fluid cyclonic separator with an optional booster fan process for increasing fluid velocity and/or adjusting fluid pressure;
  m. connecting multiple outlets of the curved duct systems to a down-stream passive filtration device;
  n. connecting multiple outlets of the curved duct system to a down-stream active filtration device;
  o. connecting multiple outlets of the curved duct system to a down-stream active filtration device wherein a filter cassette has a movable dust extraction hood to remove ejected contaminants outside of the void space area of the in-coming stream;
p. connecting multiple outlets of the curved duct system to a down-stream active filtration device wherein a filter cassette has a movable particle extraction hood to remove ejected contaminants outside of the void space area of the in-coming fluid stream where the cleaning cycle is supported be a jet system on the down-stream side of the fluid stream wherein an optional fluid storage reservoir exists;
q. providing a down-stream variable speed main system fan process which is connected to a vacuum pressure sensor, before or after or within the multi fluid-splitter and adjusting fan speed so as to influence the inlet pressure of the system and as such making fine or coarse adjustments to the speed of the speed main system fan can maintain inlet pressure at a constant which is for many up-stream or down-stream processed an advantage.

The method is particularly useful in the manufacturing environment for producing fast moving consumer goods, preferably selected from the group consisting of open type or closed pant type diapers for babies or adults, or feminine hygiene articles, wherein the fluid is air, and wherein the particle loaded air stream result from pre-processes, preferably one or more selected from the group consisting of a trim suction process step;
a general process air suction process;
a conveyor vacuum air stream process;
a dust control operation vacuum air process;
a cellulose disintegration process;
a transfer or laydown process for particulate materials, preferably cellulosic pulp or superabsorbent particles.

In another aspect, the present invention is an apparatus for removing particles from a particle loaded fluid stream, wherein the apparatus comprises A at least one, preferably a multiplicity of fluid splitter device(s), each comprising A1—a curved, preferably circular, duct system, optionally comprising more than one turn, which is adapted to deflect an incoming particle loaded fluid stream into a rotational movement, and
to hold the incoming particle loaded fluid stream in this rotational movement for a time period allowing particles of the particle loaded fluid stream to accumulate on the outward portion of the rotating fluid stream;

A2—a dividing object, preferably a splitting blade, either fixed or adjustable, adapted to separate the outward portion of the rotating fluid stream from the inward portion of the rotating fluid stream whereby the outward portion of the rotating fluid stream is a particle enriched fluid stream, and the inward portion of the rotating fluid stream is a particle depleted fluid stream, relative to an incoming particle loaded fluid stream;

A3—a first duct body adapted to hold and guide the outgoing particle enriched fluid stream;

A4—a second duct body adapted to hold and guide the outgoing particle depleted fluid stream;

B—a cyclonic separator device, connected to the at least one or to the multiplicity of fluid splitter device(s) by their first duct bodies, optionally by further duct bodies, such that the particle enriched fluid streams of the fluid splitter devices are fed to the inlet of the cyclonic separator.

Optionally the apparatus may comprise one or more elements selected from the group consisting of
- multiple fluid splitter devices being arranged in parallel;
- multiple inlet feed ducts to the fluid splitter devices being connected into a common fluid balancing void space to ensure that inlet pressures across multiple systems are similar, preferably essentially the same;
- multiple outlet feed ducts of the fluid splitter device being combined into a common outlet stream duct adapted to hold and guide a common particle loaded fluid stream;
- multiple outlet feed ducts and/or the common particle loaded fluid stream being connected to a fluid cyclonic separator device, optionally further comprising a booster fan positioned before or after the cyclonic fluid separator;
- multiple outlet feed ducts of the fluid splitter device and/or the cyclonic separator device being connected to a down-stream passive filtration device;
- multiple outlet feed ducts of the fluid splitter device and/or the cyclonic separator device being connected to a down-stream active filtration device;
- multiple outlet feed ducts of the fluid splitter device and/or the cyclonic separator device being connected to a down-stream active filtration device wherein a filter cassette has a movable dust extraction hood to remove ejected particles outside of the void space area of the in-coming fluid stream;
- multiple outlet feed ducts of the fluid splitter device and/or the cyclonic separator device being connected to a down-stream active filtration device wherein a filter cassette has a movable dust extraction hood to remove ejected particles outside of the void space area of the in-coming fluid stream where the cleaning cycle is supported by a fluid, preferably a jet system on the down-stream side of the fluid stream, further optionally comprising a fluid storage reservoir;
- a down-stream variable speed main system fan process which is connected to a vacuum pressure sensor, before or after or within the apparatus, whereby the adjusting of the fan speed influences the inlet pressure of the system, and allows for making fine or coarse adjustments to the speed of the speed main system fan so as to maintain the inlet pressure at a constant level, thus providing advantageously stable conditions for up-stream or down-stream processes.

BRIEF DESCRIPTION OF DRAWINGS

FIGS. 1 A and B depict a conventional traditional cyclonic separator in different views.

Same numerals in various figures refer to same or equivalent features or elements.

DETAILED DESCRIPTION OF INVENTION

Figure 2A:
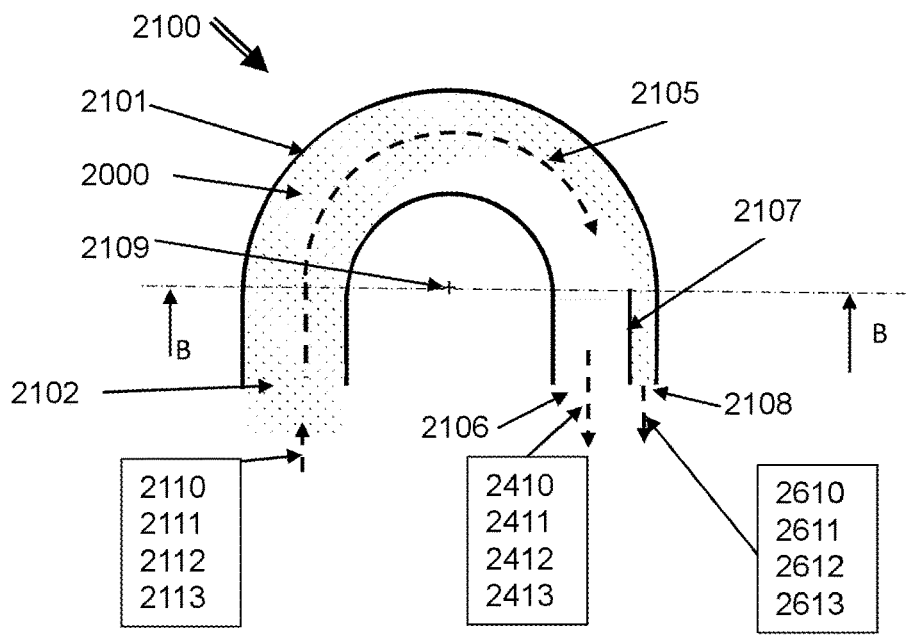
FIGS. 2 A and B depict various executions of well-known fluid-splitter devices in varying views.
FIG. 2C to F depict various executions of fluid splitter devices suitable for the present invention.
Figure 2B:
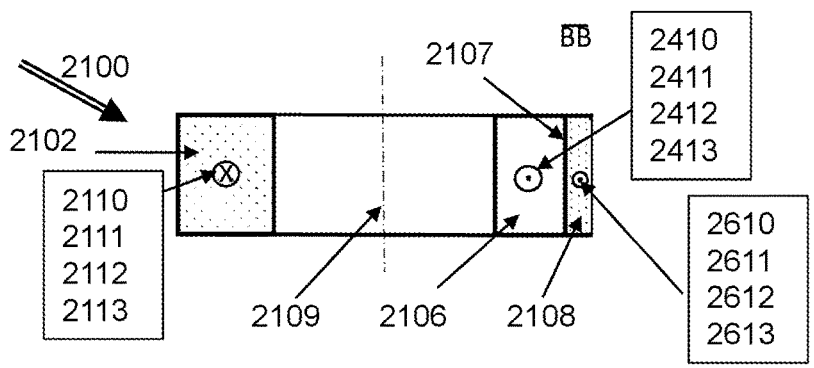

Thus, the present invention is directed to an apparatus for and a method of cleaning a particle loaded "dirty" fluid using a combination of cyclone and fluid splitter technology. Whilst the present invention is particularly useful for applications of separating particles from a gas stream, and in particular an air stream, all embodiments of this invention can be used for essentially all kinds of fluids, liquid and gas types, that can carry matter, especially particles, suspended therein, with this matter exhibiting a higher density than the fluid which may be gas like air, or a liquid like water, mercury, sewage, and may be applied under ambient conditions or at temperatures between about 0° C. to about 50° C. or even ranging from just above 0 Kelvin up to 2500 Kelvin and pressures from 0.1 bar to well over 100 bar.

A first element useful in the present invention is a cyclone. In case of the fluid being a liquid, such as water or a water based fluid, reference may be made to a "hydrocyclone", whilst in case of a gas being the fluid it is referred to as a gas cyclone. Within the present context, the term "cyclone" refers to a cyclone for a liquid fluid or a gaseous fluid. The present invention is particularly applicable to the fluid being air, which is loaded with particles, such as with contaminants.

The principle of a conventional cyclone is generally explained in the context of FIGS. 1A and B with a top and side cross-sectional view, respectively. A cyclone separator 1100 is based on the principle of deflecting an incoming particle loaded fluid stream 1110 such that a helical and downwardly oriented and narrowing fluid stream 1110' is created in a first, inlet section 1130 of the cyclone equipment, exhibiting the cyclone diameter 1109. Whilst the fluid is drawn upwardly in the center portion 1150, the heavier particles accumulate due to centrifugal forces along a path 1605 at the walls of the second section 1140, typically below the first section and typically having the characteristic shape of narrowing downwardly, and move downwardly by gravity, indicated by arrow 1610, to leave the cyclone at the particle outlet 1620. The fluid is swirling in the cyclone and is removed via the center portion 1150 with an outlet diameter 1119 as particle depleted fluid stream 1410 at the "clean" outlet 1120. It is a further characteristic of such cyclones, that the fluid is strongly deflected as indicated by flow path 1302 and thus a large pressure drop occurs. Optionally, additional process support fluid 1200 may be added in the lower portion of the inlet portion of the cyclone.

As seen in FIG. 1B, the particle loaded fluid stream vci (1110) entering the cyclone comprises the incoming pure fluid stream fci (1112) and the incoming particle stream pci (1113), all streams may be expressed in kg/min, thus exhibiting an incoming particle load Pci (1111), as the ratio of the particle stream to the particle loaded stream, i.e., pci divided by vci expressed in kg/kg. The incoming particle loaded fluid stream is separated by the cyclone into the particle depleted ("clean") fluid stream and the particle enriched ("dirty") stream. The particle depleted fluid stream vcc (1410) exiting the cyclone via exit 1120 comprises the pure "clean" fluid stream fcc (1412) and the particle stream pcc (1413) in the pure fluid stream, whereby the particle stream is significantly reduced compared to incoming particle stream pci (1113), such that the particle load Pcc (1411) is significantly lower than Pci (1111). The particle enriched ("dirty") stream vcd (1610) exiting the cyclone at exit 1620 comprises the separated particle stream pcd (1613) and the pure fluid stream fcd (1612), whereby the latter may be very low or even essentially zero. Thus the particle load at the "dirty" exit 1620 Pcd (1611) may be very high or be essentially 1.

Whilst the cyclone is shown in a "vertical" positioning, i.e., the fluid is entering the cyclone horizontally, the clean fluid upwardly, and the particles downwardly, relative to gravity, cyclones may also be operated in a position angled relative to gravity.

The pressure drop of a cyclone can be linked to the following important contributing effects:
1) Acceleration, inlet deflection and (in case of compressible fluids) contraction of the incoming fluid stream, including acceleration of the particle load. For air cyclones, the inlet speeds often are above 10 m/sec and below 30 m/sec.
2) Deflecting the fluid into the helically movement inducing the barrel friction at the walls of cyclone.
3) Removal of all or at least a larger portion of the fluid through the central portion 1150, whereby the fluid flow direction undergoes a sharp change (see arrow 1302 in FIG. 1).

In the case of air cyclones, the third category (energy required to remove the particle depleted air out of the center of the cyclone) is often around two times the energy of the second category (energy required to rotate the air in a helical or cyclonic form) which can be easily explained as the radius of curvature is indeed sharper. For high performance cyclonic air separators as may have a diameter of the inlet portion 1300 ranging between 200-500 mm, the air is often removed through the center portion 1150 of the cyclone with a much smaller radius, on average around half of the 200-500 mm diameter and in some instances, the radius of this air-flow is as low as just 10 mm radius, inducing the large pressure drop.

Cyclones can be optimized by design and operating conditions, however, there is a general trade-off of particle removal efficiency versus pressure drop that has to be overcome. Also, turbulence in the cyclone may result in carrying particles into the particle depleted outlet stream.

Well known options for improving the efficiency are connecting multiple cyclones, either parallel, such that the smaller cyclones have a better particle removal efficiency whilst the multiplication of these is adapted to cope with the total fluid flow rate, or sequentially, whereby decreasing sizes along the sequence or stages improves the cleaning efficiency over the stages.

The operation of a cyclone is often linked to the centrifugal forces, which are often expressed relative to the gravity force, i.e. a G-force of x corresponds to a force as exerted to a mass, such as a particle, is x-times as high as the gravity force. For example, the separation performance of a cyclone may be increased by increasing the G-Force, which equates to (mass of the particle times square of the velocity) divided by the radius—such that better separation can be achieved by higher velocity of the fluid flow or reducing the radius of the cyclone (see 1109 in FIG. 1A). As increasing the incoming fluid velocity would require further energy and in some installation scenarios prefer the reduction in radius. To understand the effect of reducing radius, the G-Forces are depicted in Table 1 for ambient air as fluid assuming a constant inlet velocity of 20 m/sec:

TABLE 1

| R = 1000 mm | G-Force = 40.788 | R = 500 mm | G-Force = 81.577 |
| R = 900 mm | G-Force = 45.320 | R = 400 mm | G-Force = 101.972 |
| R = 800 mm | G-Force = 50.985 | R = 300 mm | G-Force = 135.962 |
| R = 700 mm | G-Force = 58.269 | R = 200 mm | G-Force = 203.943 |
| R = 600 mm | G-Force = 67.981 | R = 100 mm | G-Force = 407.886 |

Based on the above G-Force calculations, it is clear that a higher separation performance can be achieved with a smaller cyclone diameter. A smaller diameter equates to smaller air-flows meaning multiple systems would be needed to handle meaningful air-flows. For example, for one larger cyclonic separator of radius R=1000 mm, the resulting G-force exerted on the incoming particle loaded air stream is just 40.7886 G. Taking another example of distributing the same incoming particle loaded air stream into 10 smaller systems in parallel with just a radius R=100 mm the resulting G-force exerted on the incoming particle loaded air stream is 407.886 G, thus enabling better separation efficiency, however at an increased energy consumption due to a higher pressure drop in the multiple smaller cyclones.

The present invention aims at employing the benefits of a cyclone system, namely a good particle removal efficiency, whilst avoiding a large pressure drop of the fluid stream. This is achieved by connecting at least one, preferably a multiplicity of pre-separators with one cyclone separator, whereby the pre-separators are executed as "flow splitters", whereby a fluid stream is guided into a generally curved, such as a circular, flow, such that—with nomenclature in analogy to the description of a cyclone in the above—the particles accumulate at the outward portion and then the fluid stream is split into a particle enriched ("dirty") fluid stream and a particle depleted ("clean") fluid stream with a very low particle load, both relative to the incoming particle loaded fluid stream. Thus, only a very small portion of the incoming particle load is in the particle depleted fluid stream.

Consequently, the outgoing particle enriched fluid stream carries most, preferably all of the particle load, at a moderately high particle load ratio, the latter referring to the ratio of the weight of particle and fluid, as may be expressed in kg particles per kg of fluid, or for steady flow conditions also as a flow ratio, i.e., kg/min of particle flow per kg/min of fluid flow. Such a fluid splitter is generally known in the art (see e.g., above referenced EP2334407 with respect to an air splitter) and can be operated at a low pressure drop.

Then, the particle enriched fluid streams of several pre-separators are merged and fed to a cyclone separator with a high separation efficiency for the particles at higher pressure drop, however this pressure drop applies only to a relatively small fluid stream.

The principle of a suitable pre-separator is schematically depicted in FIG. 2A as a cross-sectional side view and 2B with a cross-sectional bottom view.

Thus, an incoming particle loaded fluid stream vsi 2110, comprising incoming pure fluid stream vsi 2112, incoming particle stream psi 2113, thus exhibiting incoming particle load Psi 2111 is delivered to a fluid flow splitter 2100 in an inlet section 2102. As shown in FIGS. 2A and B, the splitter is in the form of a duct, here shown with a rectangular cross-section, and may have a semi-circular shape around a duct axis 2109, thus directing the fluid into a rotary flow indicated by curved arrow 2105, such that particles 2000 accumulate towards the outer wall of the splitter device due to centrifugal forces. At the end of the semi-circular portion, i.e. at a curvature angle of 180°, a dividing object, here shown as a splitter blade 2107 extending across the cross-section of the duct separates the
- particle depleted ("clean") fluid stream vsc 2410 with
  - particle depleted pure fluid stream fsc 2410,
  - particle depleted fluid stream particle stream psc 2413,
  - and thus exhibiting a particle depleted particle load Psc 2411, from the
- particle enriched ("dirty") fluid steam vsd 2610 with
  - particle enriched pure fluid stream fsd 2612,
  - particle fluid stream particle stream psd 2613,
    - thus exhibiting a particle enriched particle load Psd 2611.

As shown in the figure, the particles are gently directed outwardly such that after the splitter blade 2107 the particle depleted stream and the particle enriches stream may exit the separate at exits 2106 and 2108, respectively, from where they may be further guided to downstream processes or to the environment.

The exact positioning of the splitter blade allows to determine, and vary, if desired, the sharpness of the separation, i.e., the more the splitter blade is positioned inwards, the more particles are separated into the particle enriched fluid stream, however also more fluid is directed thereto.

Figure 2C:
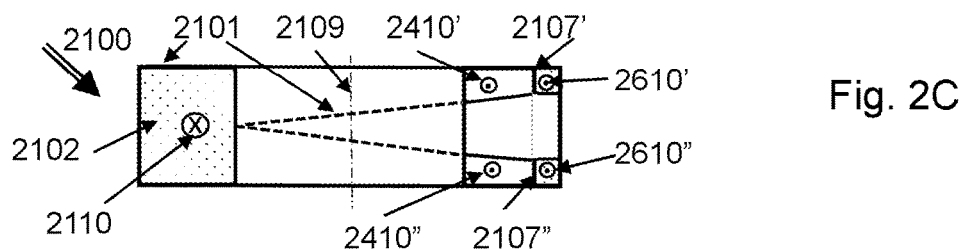

FIG. 2C depicts a variant of such an equipment, wherein the fluid stream is further separated by radially arranged separator means of the duct 2101 into a first and a second stream, as may be seen as a left and right side stream along the general flow direction of the stream, as may be guided by ductwork of the duct 2101. In each of the side streams the particles accumulate towards the radially outward duct wall, be separated by the splitter blades 2107' and 207", respectively, and may exit the fluid splitter device at enriched particle fluid stream outlets 2610' and 2610", respectively, whilst the "clean", particle depleted fluid stream exits a depleted particle fluid stream outlets 2410' and 2410", respectively.

Figure 2D:
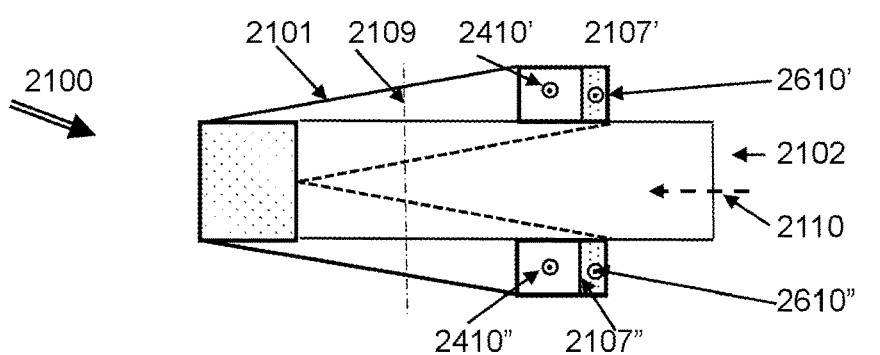
Figure 2E:
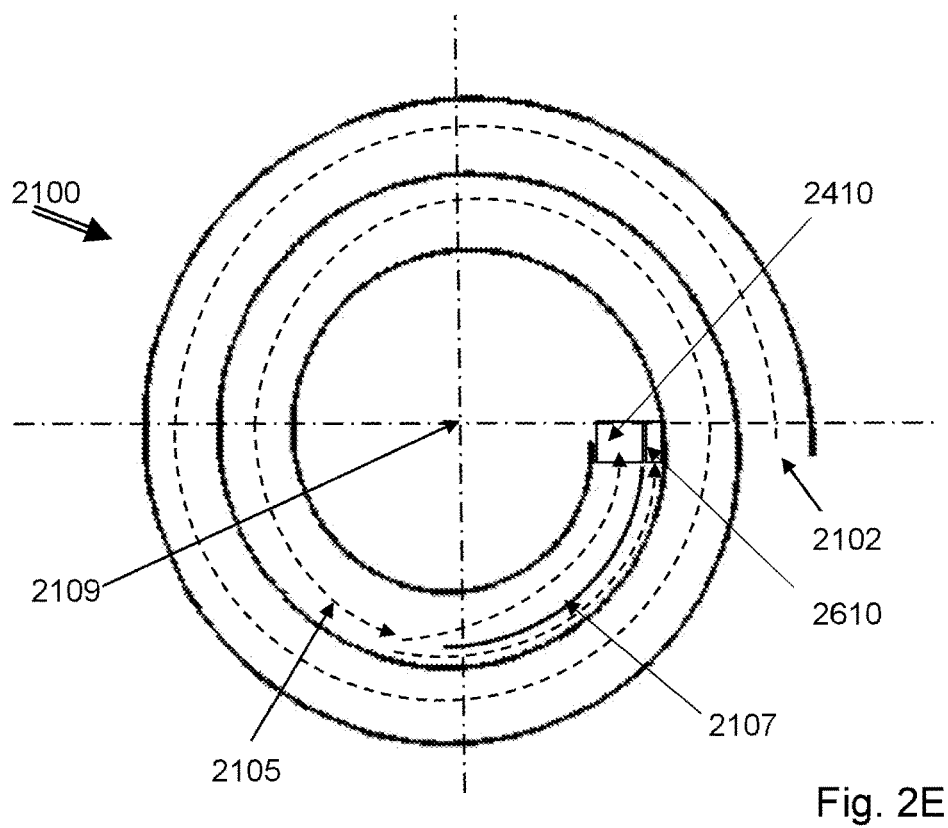
Figure 2F:
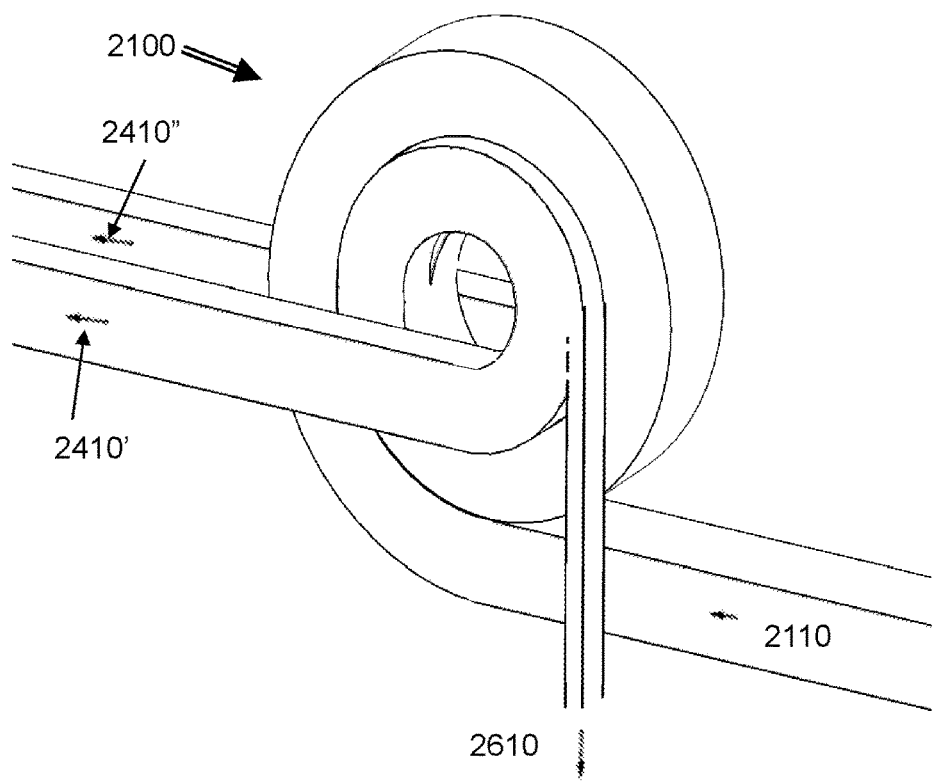

FIGS. 2D, 2E, and 2F (in a perspective view) depict a further variant, whereby the duct of the flow splitter is spirally wound, i.e. exhibits a curvature angle of more than 180° as in FIG. 2A. This provides a longer dwell time, referring to the length in time for the particles to be exposed to the radial forces, and thus allows more of the particles to accumulate outwardly. In FIG. 2D, it may be executed with a full turn (i.e. 360°), whereby for spacing reasons the separator means of the duct leads the fluid stream outwardly along the direction of the axis 2109 preferably symmetrically to the left and right relative to the direction of the incoming fluid stream to exit regions 2410', 2410", and 2610' and 2610", respectively.

In FIG. 2E, a variant with "two turns", i.e. 720° is depicted, whereby at about 630° (or 1 and three quarter turns), the fluid splitter blade 2107 separates the particle enriched and depleted fluid stream. It should be noted, that the shown executions merely serve to explain the principles of a fluid splitter device suitable for the present invention. However, many design variants can be executed to achieve such a separation on the principle of subjecting a particle loaded fluid stream in a curved duct to a rotary flow direction, thus inducing centrifugal forces and accumulating particles that are heavier than the fluid at the outward region of the duct, followed by separating particle enriched and particle depleted fluid streams.

Typically in such an arrangement and when the fluid is a compressible fluid, such as a gas such as air, the fluid velocity is higher at the point of splitting, i.e. just before the edge of the splitting device, as compared to the inlet section 2102. Thus, a slight vacuum is created which reduces flow disturbances and eases transfer of the particles towards the outlet section 2108 for the particle enriched fluid stream After exiting the fluid splitter device, the particle depleted fluid stream 2410, 2410', or 2410" may then be released to the ambient, or in case of even lower required particle loads, to a high efficiency filter means, such as a bag filter. The particle enriched or high particle load fluid streams 2107' and 2107" are then directed via further duct work duct work towards further processing.

This results in good separation of particles and a low particle load in the low load stream at a very low pressure drop, however, there is a relatively low particle load (in kg particles per kg fluid) in the particle enriched fluid stream.

As indicated before, both a cyclone and a fluid splitter are well known and used and each can be adapted to its optimum settings for a given application, however, both systems also have their trade-offs, especially energy usage and separation efficiency for the various "cleaned" and "dirty" fluid streams.

Henceforth it is a particular feature of the present invention to combine a cyclone with relatively good separation performance at relatively higher pressure drop, and hence poor energy usage, and fluid splitter technology with a poorer separation performance at significantly better energy performance in a particular way. To this end, an overall ingoing particle loaded fluid charge is directed to at least one but preferably a multiplicity of fluid splitter devices. The fluid splitter devices deflect the fluid stream into a curved flow direction, such as a half a turn, preferably a full turn, more preferably about two turns, but possibly also more than two turns, whereby the energy loss is relatively low, as the change of direction is gradual and along a smooth, preferably almost circular flow path. Through this generally rotary movement, the particles accumulate towards the outwardly oriented portions of the duct, and a particle depleted and a particle enriched fluid stream may be separated by a splitter blade, as described in the above. The positioning of the fluid splitter blade may be adjusted so as to vary the amount of particles and "pure" fluid being directed into the particle enriched fluid stream. Preferably, the settings are such that the "clean" fluid stream has a very low, if any, particle load, and does not need to undergo further treatment before being released into the environment. Of course, this fluid stream may be further treated, such as, without limitation by bag or HEPA filters.

This results in good separation of particles and a low particle load in the particle depleted fluid stream at a very low pressure drop, however, there is still too high fluid flow in the particle enriched fluid stream.

Thus, the particle enriched fluid stream of one or more of the one or multiplicity of pre separator(s) are now collected and guided to a cyclone adapted match the flow rates and separation efficiencies of the pre-separators, where the solids are now separated with high efficiency at a moderate pressure drop, which, however only effects a significantly smaller amount of fluid than if only cyclones without the primary separators were used.

Figure 3A:
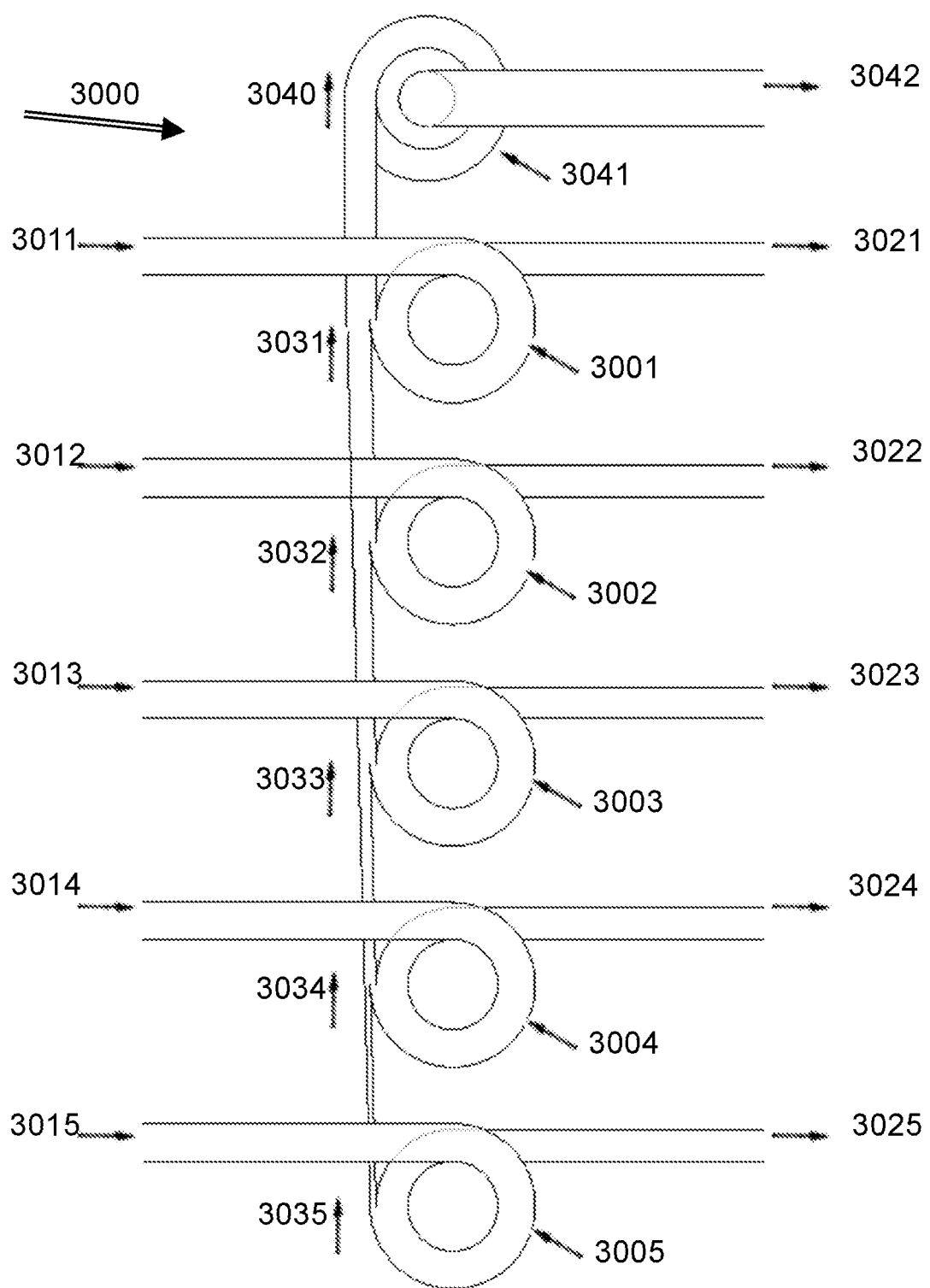
FIG. 3 A to C depict various exemplary executions of multiple fluid splitter apparatuses connected to a singular or multiple cyclone(s) according to the present invention.

This principle is further explained by referring to FIG. 3A, exemplarily for a separating apparatus 3000 comprising 5 pre-separation devices 3001, . . . 3005 in a parallel arrangement connected to a cyclone 3041. Thus, particle loaded fluid streams 3011, . . . 3015 are entering respective fluid splitter devices 3001, . . . 3005, wherein particle depleted fluid streams 3021, . . . 3025 may be emitted to the environment or to further treatment steps, such as a bag filter (not shown). The particle enriched fluid streams 3031, . . .

3035 leave the fluid splitter devices and are collected in a manifold, optionally with varying effective cross-section so as to ease the transport. The manifold is connected to a subsequent cyclone 3041 and directs the collected particle enriched fluid streams 3040 to the inlet section of a cyclone 3041, as may be of the type as depicted in FIG. 1. The particle depleted fluid stream 3042 from the cyclone may be released to the environment, or may be submitted to further treatment, such as to a bag filter, or may also be combined with the particle depleted fluid stream from the fluid splitter devices. The removed particle load may be collected at the particle enriched outlet of the cyclone, as described in the context of FIG. 1.

For example, if the fluid splitter blades of the splitter devices were set to a 5% split (i.e. 5% of the fluid stream in the splitter devices are separated into the particle enriched fluid stream), these 5% of the total fluid flow would be transferred as collected fluid stream 3040 to the cyclone 3041, and contain at least 90%, preferably at least 95% more preferably at least 99% and most preferably essentially all of the particles of the incoming particle loaded fluid stream.

Such a combination system would operate using lower energy as not inducing the sudden change in fluid-flow direction of the most of the fluid as with traditional cyclonic separators as shown in FIG. 1 along flow path 1302. As the energy required to achieve the removal of the fluid through the center of the cyclone is typically twice the energy required to achieve the helical downward fluid movement, such a combined system of fluid splitter devices with a cyclone can operate at less than half, preferably less than a third or even less than a fourth of the energy versus traditional cyclonic separators alone. Such a combined system can also achieve a far higher separation performance as turbulences are significantly reduced.

The benefits of such a system are clearly evident, not just in terms of energy, but also in terms of significantly reduced, if not completely eliminated maintenance effort, for example when comparing to a system where the collected fluid streams after the fluid splitter devices (see 3040 in FIG. 3) were transferred to another standard filter system such as bag-house or drum filter requiring significant maintenance.

Considering exemplarily an air cleaning system with 10 air-splitter devices in parallel, each processing 500 m³/hr. The pressure drops across such air-splitters is around 250 Pa (1 Inch of water gauge) and as such, each splitter would require 0.03 kW electric power to operate, thus the total system would require 10×0.03 kW, i.e. 0.3 kW. Assuming further for simplicity, that the splitters are set-up to split 10% of the total air stream and this particle loaded air-stream would flow into the conventional cyclonic air separator as depicted in FIG. 1, this traditional cyclonic air separator would also be receiving 500 cubic meters per hour, but the pressure drops are higher at 250 Pa (250 inch of water column) when operating at the same centrifugal or G-Force as of the air-splitters and as such a conventional cyclonic air separator would require 0.1 W to operate. Thus, a system according to the present invention, combining 10 air splitters with one cyclone would therefore require (1×0.1 kW)+(10× 0.03 kW)=0.31 kW in total.

If we compare this with a system made up of conventional cyclonic air separators, then the total energy for this system would require (10×0.1 kW)=1 kW in total. The differences in power requirements are clear 0.31 kW versus 1 kW or 31% which equates to a saving of 69% versus traditional cyclonic air separators. Such a multi splitter and cyclone system technology not only achieves a saving of 69% versus conventional cyclonic air separators but also achieves an almost or fully zero maintenance system and also a far higher separation performance versus traditional cyclonic air separators due to significantly reduced internal turbulence.

Figure 3B:
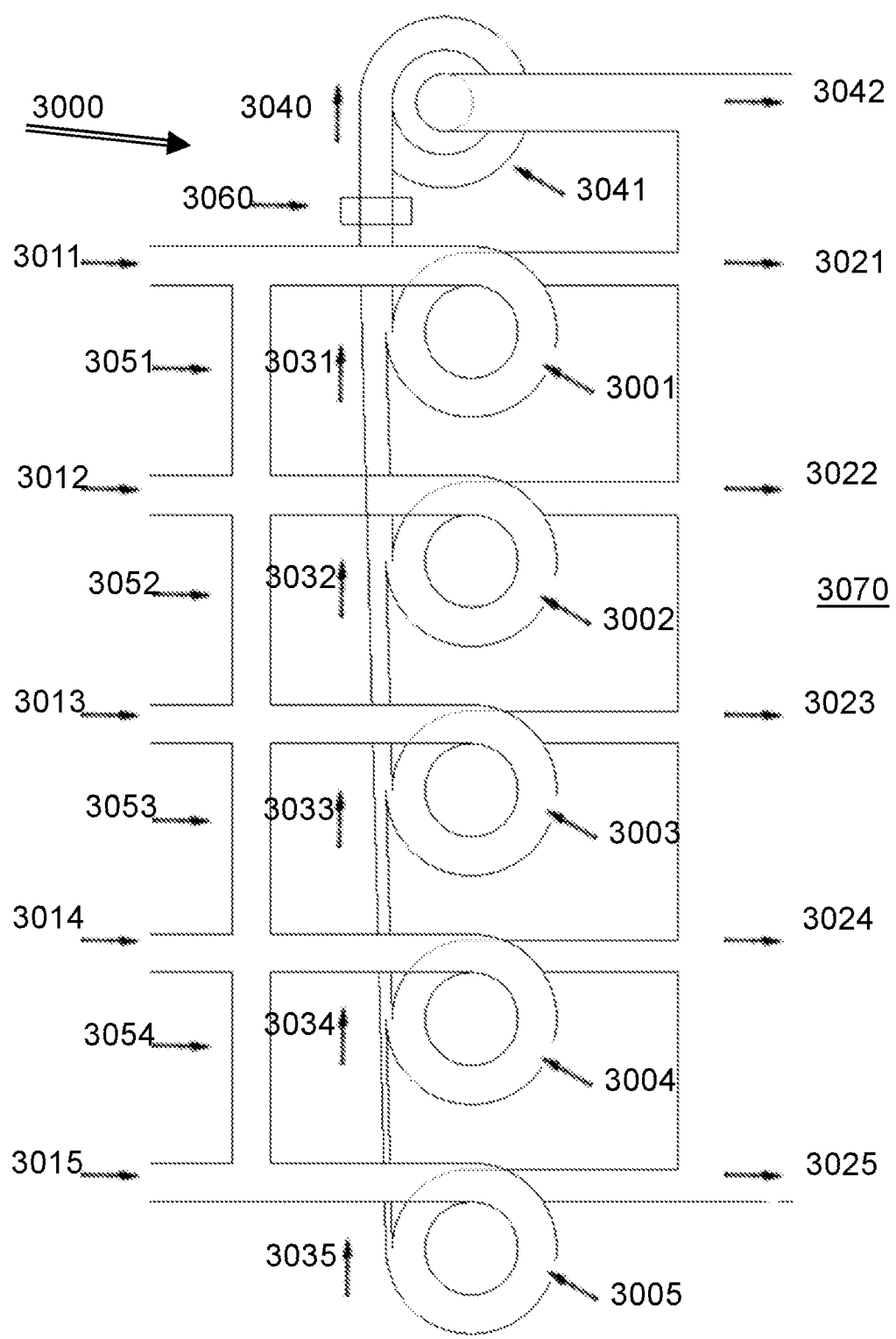

Further option for executing the present invention are outlined in FIG. 3B, e.g. in case for treating a particle loaded fluid. It may be desirable for operational simplicity that the clean-fluid outlet 3042 the cyclonic separator 3041 is combined with the clean fluid exit streams 3021, . . . 3025 of the splitter devices 3001, . . . 3005. However, in such a scenario, there would be a significant performance loss as the outlet pressures of the fluid-splitters and of the cyclonic separator would be the same, but as the cyclonic separators would—in case of considering air—typically be operating at a pressure drop of about 750 Pa (3 inch of water column) and the fluid-splitter would be operating at about 250 Pa (1 Inch of water column), this would create a miss-match of flows which would ultimately cause the particle enriched fluid flow streams from the fluid-splitters 3031, . . . 3035 to slow down which would in turn cause enhances turbulence within the splitter device just before the edge of the splitter blade (see FIG. 2E, 2107) which in turn can cause a vast drop in separation performance.

Thus it may be preferable in such instances to add a balancing means such as a booster fan or pump 3060 (FIG. 3B) which can be used to balance the system and ensure fluid velocities just before the splitter blade to be similar and as such, turbulence can be reduced or even eliminated. Furthermore it is noted that if the balancing means 3060 is running slightly faster than needed, then the particle enriched fluid stream (see FIG. 2E, 2610) would be traveling at a higher velocity than the particle depleted fluid stream (see FIG. 2E, 2410), thus creating an under pressure in the particle enriched fluid stream that would cause to further suck particles that indeed happen to be disturbed by turbulence prior to the separation zone into the particle enriched fluid stream rather than into the particle depleted fluid stream.

Yet a further independent embodiment of this invention aiming at stabilizing the process is outlined also in FIG. 3B. For installation scenarios where the outfeed clean fluid streams 3021, . . . 3025 of the splitter devices and optionally also the outlet stream 3042 of the cyclone 3041 are collected into a common space 3070 as shown in FIG. 3B, and if the infeed particle loaded streams 3011, . . . 3015 are at the same differential pressure then all flow splitters 3001, . . . 3005 operate at the same or at least very similar pressure such that the entire system is balanced.

If, however, the infeed particle loaded fluid streams 3011, . . . are not operating with the same differential pressure then all flow splitters 3001, . . . would operate with a different pressure, meaning the entire system would not be balanced. Thus, it may be preferred to create a pressure balancing void space 3051, . . . connecting the infeeds prior to the splitter devices, which ensures the system is balanced and the infeed particle loaded fluid streams are at the same differential pressure such that all flow splitters 3001, . . . are operating at the same or similar pressure, meaning the entire system is balanced.

In some operational environments, a different centrifugal (G-) Force may be desirable. Further embodiments of the present invention aim at improving the operation by varying speed and/or centrifugal (G-) Force. Assuming for example that in FIG. 3B, the incoming particle loaded fluid streams 3011, . . . 3015 are coming from different process steps, such as in case of a hygiene product manufacturing plant, from a trim suction process, from a conveyor vacuum, from a dust control operation, from a core laydown process operation, or from other process operations, all processes may emit a range of contaminants.

The trim suction process air stream is mainly clean and could now and again receive a large contamination pieces, whilst the process operation process air stream is mainly clean with occasional smaller contamination, whilst conveyor vacuum air stream is mainly of contaminant particles of between about 50 μm to about 200 μm in diameter, whilst dust control operation vacuum air stream is mainly of contaminant particles of between 1 μm and 200 μm in diameter, whilst core laydown process vacuum air stream is mainly of contaminant fine particles of between 0.1 μm and 10 μm in diameter, whereby diameter refers to the diameter of spherical particles of equivalent diameter of particles of other shape.

A skilled person will readily realize, that it is neither desirable to operate the air-splitters of the trim suction process air stream at a high centrifugal (G-) Force, as this stream is largely clean, nor to operate the air-splitters of the core laydown process vacuum air stream at a low centrifugal (G-) Force, as this stream is contaminated with fine particles of between 0.1 μm to 10 μm in diameter and would require a higher G-Force to separate efficiently.

With all of these scenarios, the higher the centrifugal (G-) Force is, the higher the energy is needed to operate the system. Considering a production unit and process for fast moving consumer goods, such as hygiene articles, for which the present invention is particularly suited, various pre-processes may provide particle loaded fluid stream requiring quite different conditions for a good separation performance, e.g., the trim suction process air stream requires to be operated at about 50 time gravity (~50 G),
whilst the process operation process air stream requires to be operated at about 100 times gravity (~100 G),
whilst the conveyor vacuum air stream requires to be operate at about 300 time gravity (~300 G),
whilst dust control operation vacuum air stream requires to be operated at ~500 G,
whilst core laydown process vacuum air stream requires to be operated at ~1000 G.

Setting the design (e.g. diameter, or number of turns) and/or the operating parameters, especially air flow rate or speed, for each pre-separation device accordingly an excellent separation would take place whilst reducing energy even further in in such circumstances, energy savings of 90% can be achieved versus traditional cyclonic air separators.

Figure 3C:
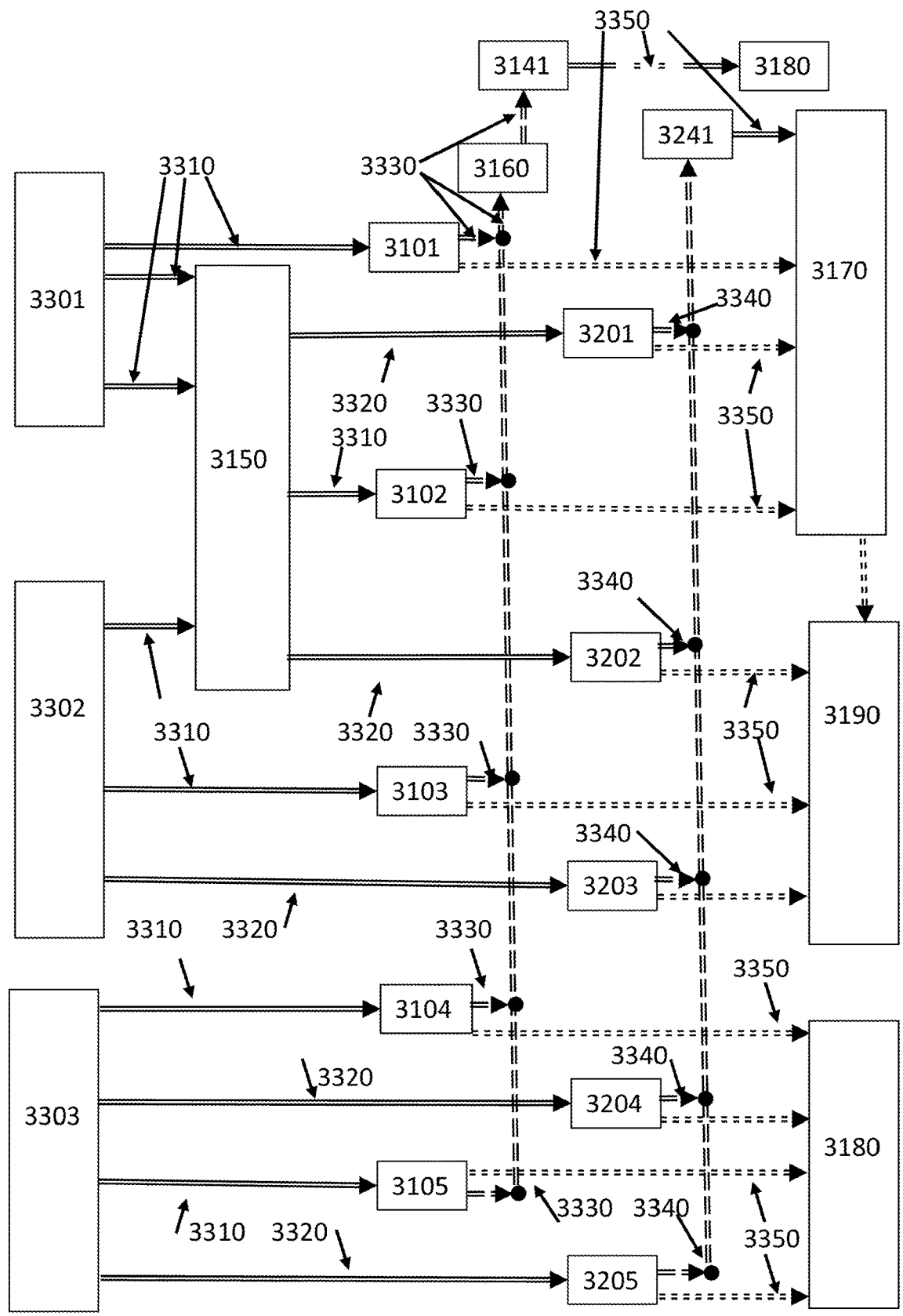

Thus various executions of the present invention are depicted in FIG. 3C. Various pre-processes 3301, 3302, . . . discharge particle loaded infeed fluid 3310 (indicated by solid double arrows) to a first multiplicity of fluid splitter devices 3101, 3102, . . . , optionally via fluid flow 3120 through balancing volumes 3150. Other pre-processes may discharge the particle loaded infeed fluid 3320 to a second multiplicity of fluid splitters 3201, 3202, . . . . The fluid splitters separate the infeed into particle depleted fluid streams 3350 (indicated by short-dashed double arrows) and into particle enriched fluid streams 3330 (indicated by dashed double arrows). The particle deplete fluid streams may be fed into the ambient 3180, or into a post-treatment unit such as a media filter 3190, optionally via a plenum 3170. The particle enriched fluid streams of the first multiplicity is fed to a first cyclone 3141, and the ones of the second multiplicity of splitters into a second cyclone 3241, and the further particle depleted fluid streams from the cyclones may be released to the ambient 3180, or—optionally via a plenum 3170, which may be the same as for the particle depleted fluid streams from the splitter—to a post-treatment unit, such as a downstream filter process, optionally such as described herein below.

The skilled person will readily realize that there are numerous options within the described scenarios and within the scope of the present invention to connect
the pre-processes,
the optional common volume(s),
the first, second or further multiplicities of fluid splitters,
the optional booster fan(s),
the first, second or further cyclones connected to the respective multiplicities of splitters,
the plenum(s)
the post treatment unit(s),
the exit(s) to the ambient.

In an optional embodiment of the present invention, a variable speed main system fan 3160 may be added, which is connected to a vacuum pressure sensor, with before or after or within the multi-fluid-splitter. Adjusting fan speed influences the inlet pressure of the system and as such, making fine or coarse adjustments to the speed of the speed main system fan can maintain inlet pressure at a constant which is for many up-stream or down-stream processed an advantage. Obviously, in case of liquid fluids, the fan may be replaced by a pump.

A further execution of the present invention is to add particular optional downstream filtration processes, either, passive or active. With the down-stream filtration processes acting as a safe filtration stage for air filtration, and/or to improve air quality, with an explosion safe low energy up-stream multi fluid-splitter-cyclone system, it would be not preferred to add any downstream filtration processes that would compromise significantly on safety or energy requirements. Whilst adding down-stream passive air filtration is a relatively cheap equipment upgrade to install, such passive technology adds significantly to the on-going running costs through increased media replacement costs as the passive filter media has to be replaced once clogged, but also more significantly, the increased pressure drop which occurs when the filter media is clogged.

To further explain this aspect, a passive filtration stage is assumed for processing 50,000 m³/hr (50 KCMH) with a pressure drop at time of installation of 250 Pa (1 inch of water gauge) which is replaced upon clogging when the filtration stage reaches 750 Pa (3 inches of water gauge). Assuming a 85% fan efficiency and 85% motor efficiency, a total power consumption of 4.78 kW is required at start at 250 Pa (1 inch of water gauge). However, as the filter clogs over time, at 750 Pa (3 inches of water gauge), also assuming a 85% fan efficiency and 85% motor efficiency, a total power consumption of 12.21 kW is required, equating to a difference of 8.14 kW versus start up. Assuming a moderate energy costs of 8 USD Cents per kWh, this equates to an annual loss of 5563 USD per stage per system.

To avoid such losses, increasing filter media area and moving to active filtration where the filter media is kept clean, reduces significantly on-going energy costs and also filter replacement costs as active filtration systems are automatically cleaned and do not clog.

However, active filtration systems especially for air as fluid, come with a further negative: During the cleaning cycle air-born dust is typically blown throughout the filter. Not only does this dust, once settled, require cleaning, this dust also adds to the explosion fuel. As the air-borne dust is a direct fuel for the explosion, all is needed is an ignition source and the dust to be within the range between LEL (lower explosion limit) and UEL (lower explosion limit).

Therefore, air-borne dust may be captured by an automated moving hood which directly removes air-borne dust from the system once the dust has been ejected from the filter cassette. Optional additional downstream air jets may help to eject contaminants from the filter cassette and optional air reservoir connected to the air jet increases the strength of the pulse which increases contaminant ejection performance further. Optional additional upstream air jets clean the surrounding filter cartridge area to ensure the total filter system is clean prior to the moving hood departing and moving onto the next cleaning cycle.

One aspect of such safe active air-filtration stage is the need to keep all non-explosion proof electrical systems on the down-stream clean side of the air-filtration stage so as to operate it below the lower explosion limit. To achieve this, and to eliminate the number of drives, a multi-link arm system is encompassed on both the up-stream and down-stream stages. With the end of the arm on the down-stream stages connect to a drive system, with one drive system the total system can follow the needed path and operating in two axes despite only one drive axis installed on the down-stream stage. To achieve this, for each arm, a dedicated drive shaft passes from the down-stream stage to the up-stream stage.

Figure 4A:
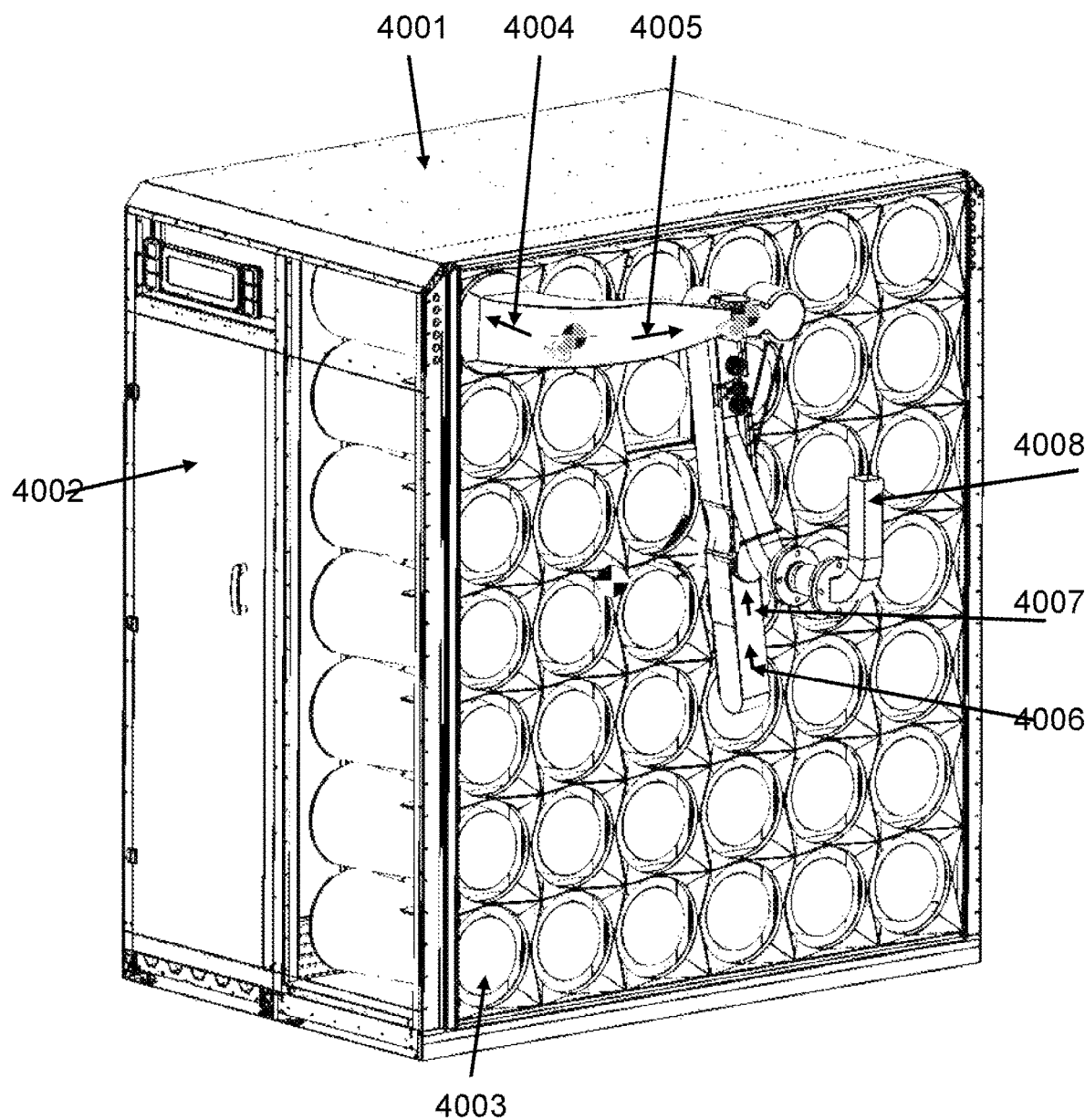
FIG. 4 A to C depict various views of an active filtration system with automatic cleaning with combined dust extraction, as may be suitably employed with the present invention system.

FIG. 4A illustrates an active air filtration module as may suitably be positioned downstream of the apparatus according to the present invention, when applied to air cleaning. The module comprises a system body 4001, which may include the side doors 4002 to allow easy access into body. The module may further comprise
- a multiplicity of filter media cartridge inserts 4003,
- a moving dust extraction hood 4004,
- a second arm linkage 4005,
- a first arm linkage 4006 with a pivot point 4007, and
- an exit duct for the fluid.

Figure 4B:
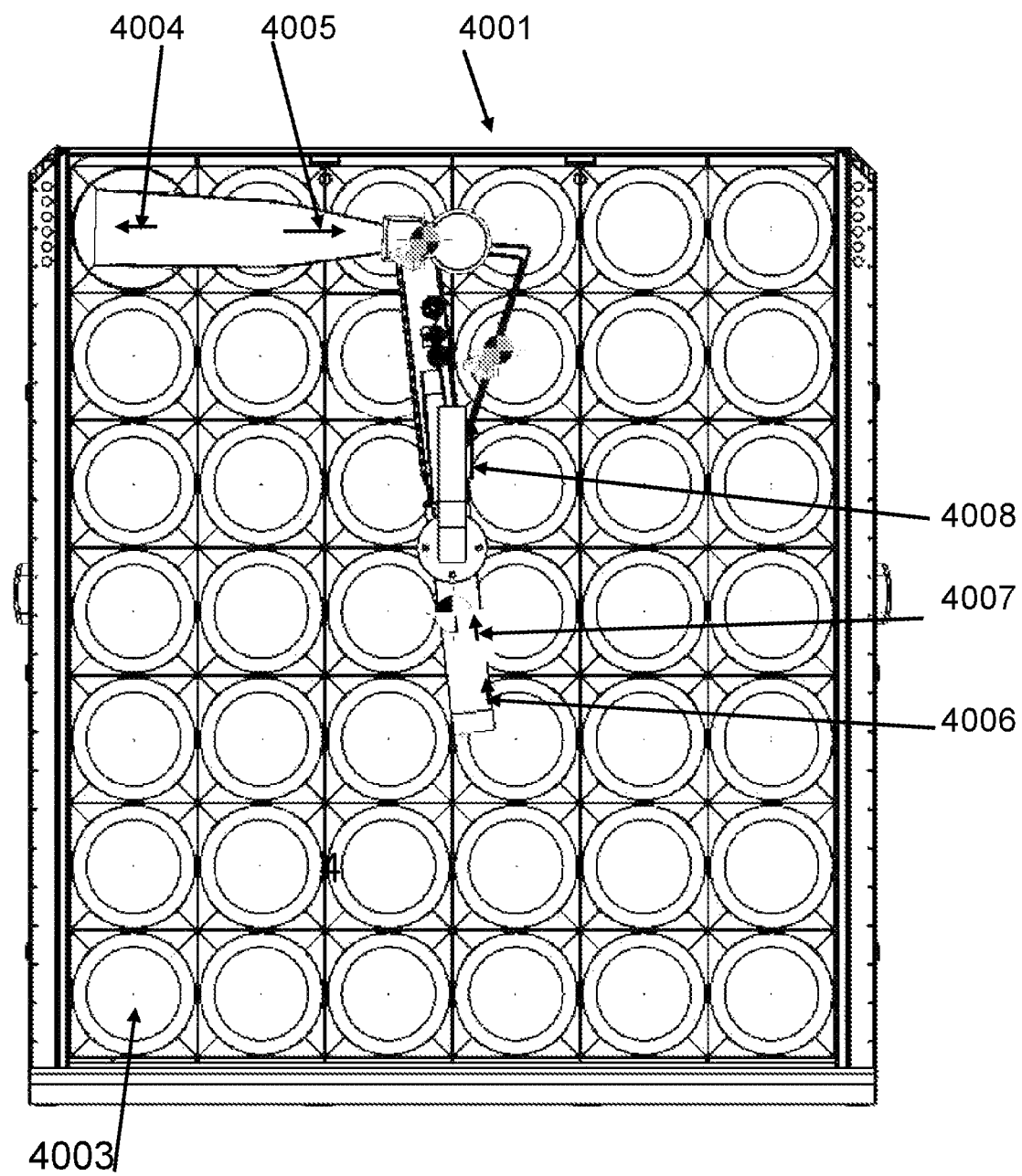

FIG. 4B illustrates an active air filtration module as outlined in FIG. 4A showing the upstream dirty air side further comprising
- the system body 4001,
- the multiplicity of the filter media cartridge inserts 4003,
- the moving dust extraction hood 4004,
- the second arm linkage 4005,
- the first arm linkage 4006, with the pivot point 4007,
- the extraction duct 4008 for the particles removed from the fluid.

Figure 4C:
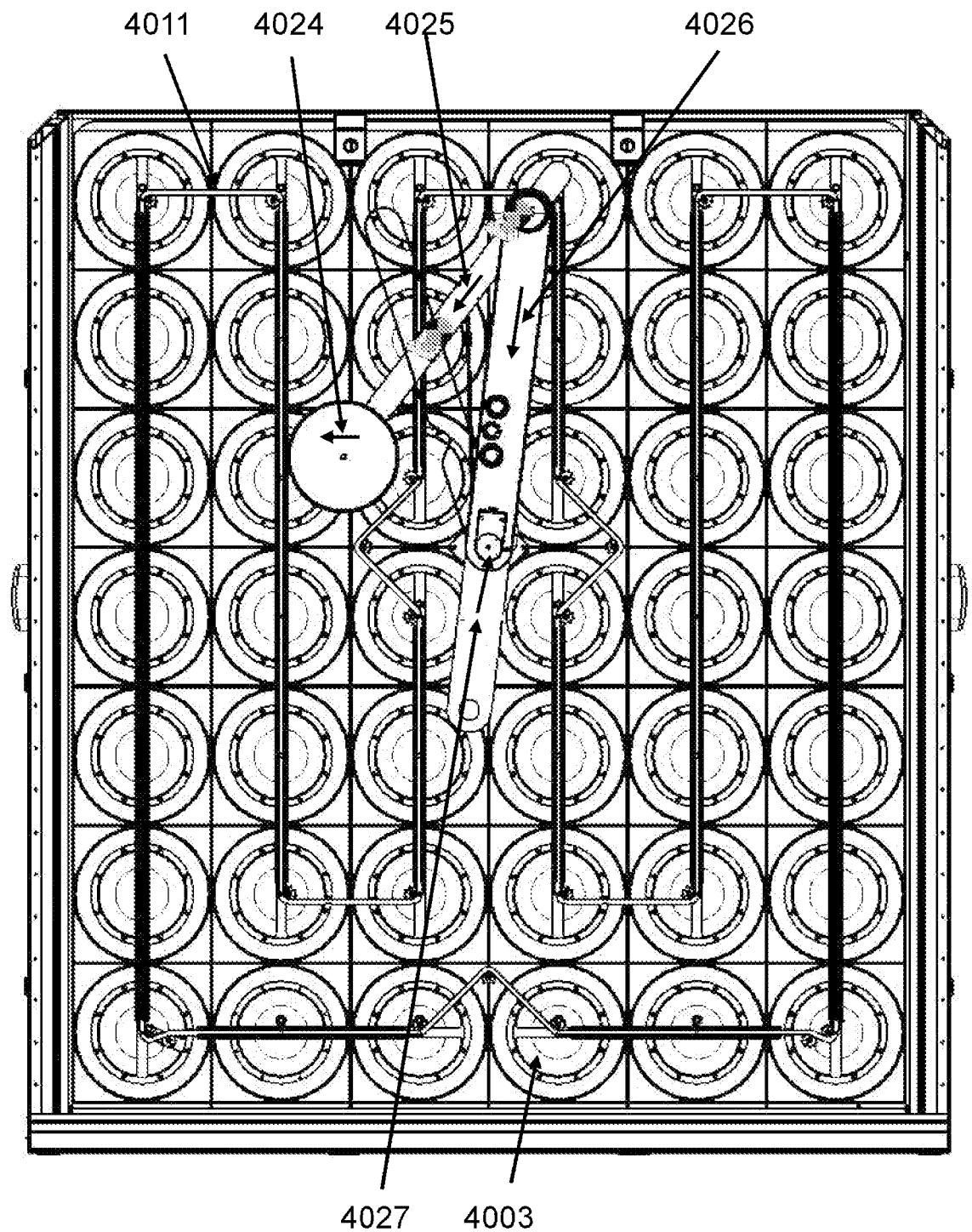

FIG. 4C illustrates an active air filtration module as outlined in FIG. 4B showing downstream clean air side with
- the system body 4001,
- the multiplicity of the filter media cartridge inserts 4003,
- a moving jet air blast system 4024,
- the second arm linkage 4025,
- the first arm linkage 4026, with the pivot point 4026,
- the drive chain system 4011.

Figure 5:
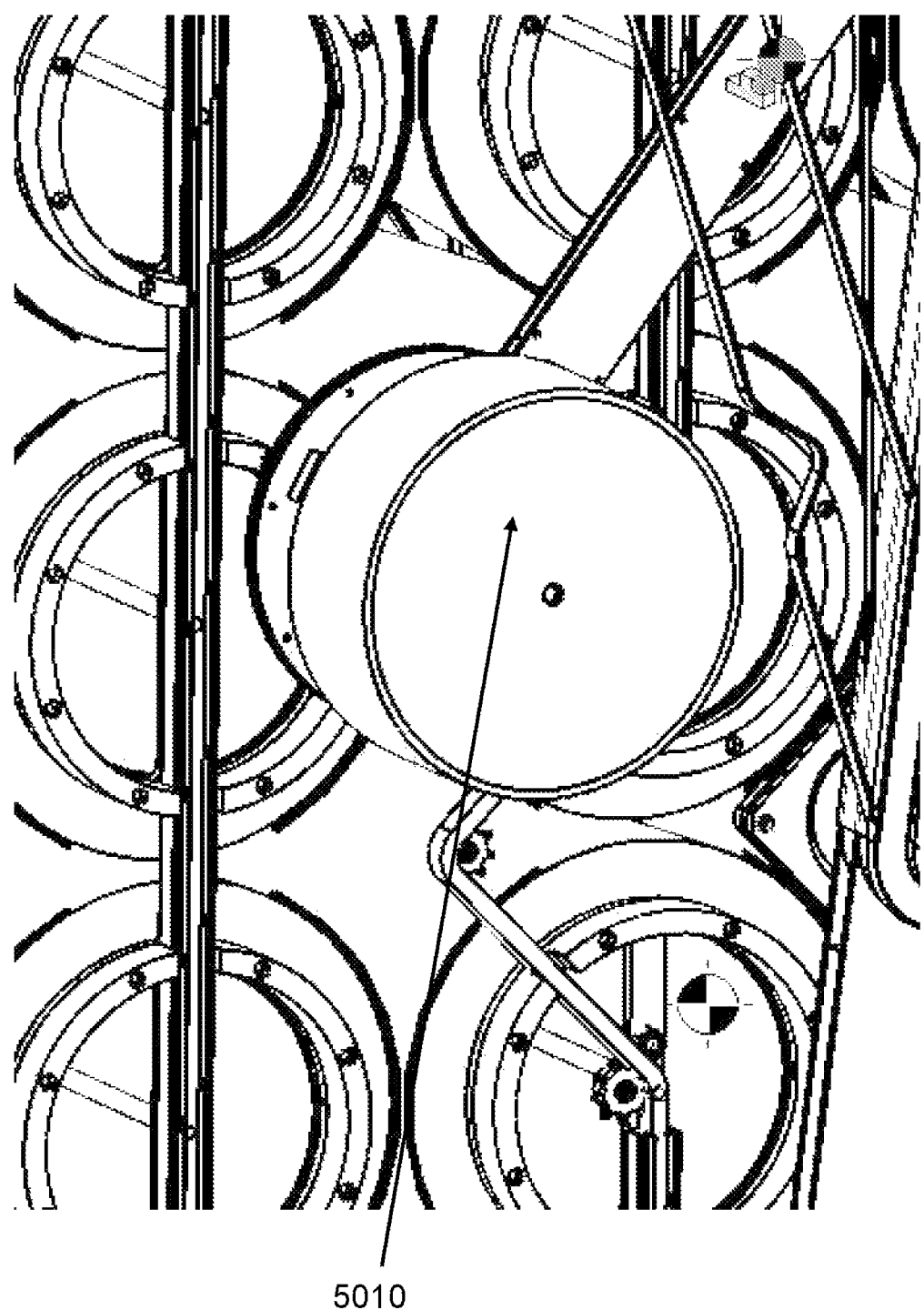
FIG. 5 depicts an active filtration as outlined in FIG. 4 showing an additional fluid reservoir.

FIG. 5 illustrates the same active air filtration module as outlined in FIG. 4 A to C, outlining optional air reservoir supply system 5010 for the jet air blast system 4024.

Figure 6:
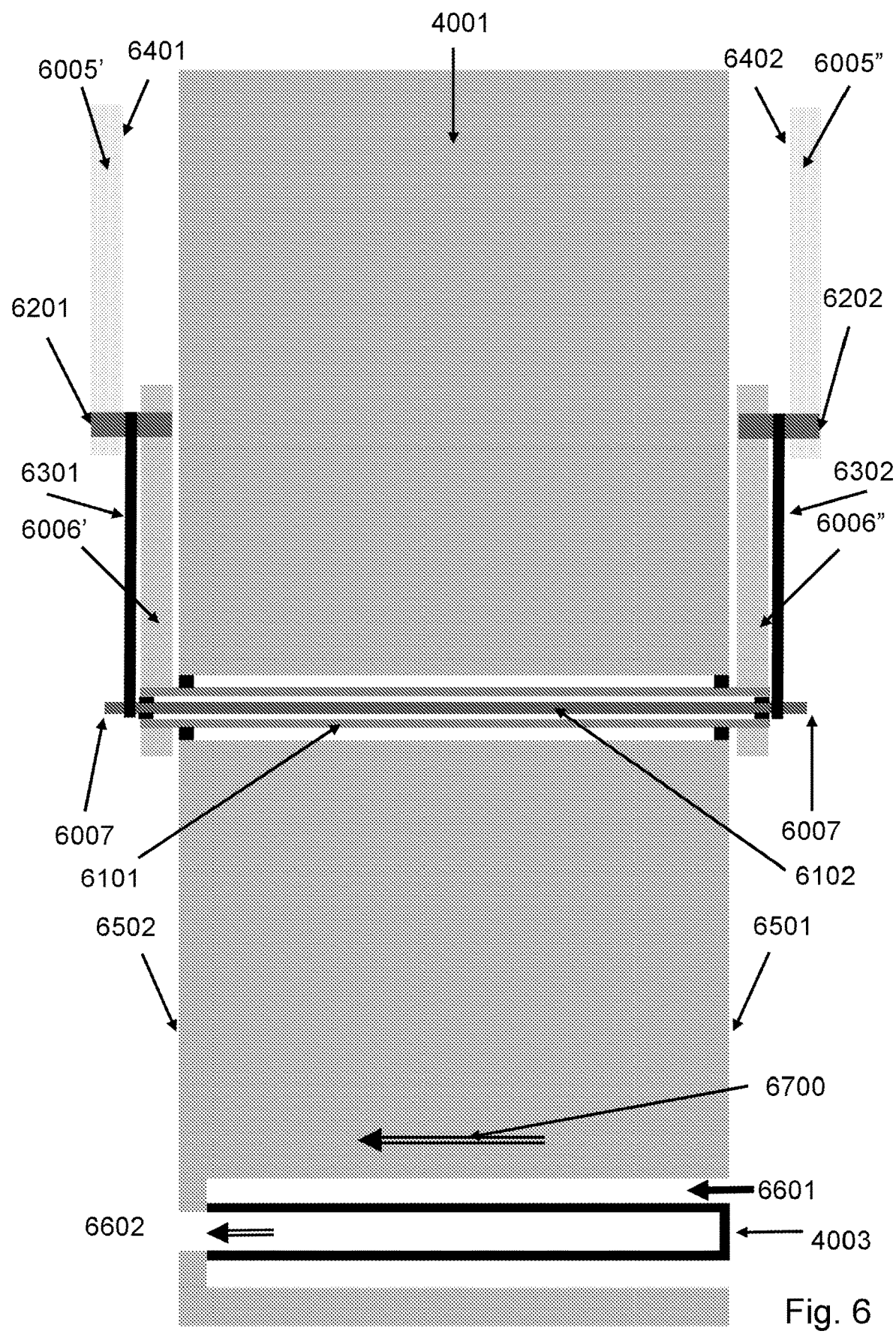
FIG. 6 depicts an active filtration as outlined in FIG. 4, showing the linked arms from dirty fluid side to clean fluid side.

FIG. 6 illustrates the same active air filtration module as outlined in FIGS. 4 and 5, outlining the cross-sectional view depicting the dual shafts with each shaft powering each arm; with
- is the system body 4001,
- the general air flow direction 6700,
- the dirty air side 6501,
- the clean air side 6502
- the filter media cartridge inserts (just one shown of multiples) 4003,
- the dirty air flow 6601 into the filter media cartridge inserts 4003,
- the clean air flow out 6602 from the filter media cartridge inserts 4003,
- the first arm linkage 6006 with the clean air side arm 6006' and dirty air side arm 6006",
- the pivot point 6007 for the first clean arm linkage 6006,
- the second arm linkage 6005 with a clean air side arm 6005' and dirty air side arm 6005",
- the connection axes 6201 and 6202 to link second arm linkage on the clean air side 6005' to the first arm linkage on the clean air side 6006' and the second arm linkage on the dirty air side 6005" to the first arm linkage on the dirty air side 6006"
- a belt 6001 to connect the rotational movement of second arm linkage on the clean air side 6005' to the rotational movement of a shaft 6102 to connect the rotational movement to a belt 6302 which connects the rotational movement via axis point 6202 to dirty air side arm 6005",
- drive chain connection point 6401, and
- the suction hood connection point 6402.

The invention claimed is:

1. A method for removing particles from a particle loaded fluid stream, said method comprising the following process steps: a) providing at least one curved duct system(s); b) providing a particle loaded fluid stream; c) feeding said particle loaded fluid stream into said curved duct system exhibiting a curvature angle of more than 180°; d) deflecting said fluid stream in said duct system in a rotational movement; e) maintaining the rotational movement of said particle loaded fluid stream for a dwell time allowing particles of the particle loaded fluid stream to accumulate radially outwardly in the rotary fluid stream; f) splitting the outward portion of said rotary fluid stream from the inner portion of said rotary fluid stream through a splitter blade, whereby said outward portion of said rotary fluid stream has a higher particle load compared to the inner portion of said rotary fluid stream; g) expelling the inner rotary fluid stream as a particle depleted fluid stream through a first exit and duct for a particle depleted fluid stream and expelling the outer rotary fluid stream as a particle enriched fluid stream through a second exit and duct for a particle enriched fluid stream wherein both the inner rotary fluid stream duct and the outer rotary fluid stream duct are separated; h) directing said particle enriched fluid stream to a cyclone separator to further separate it into further enriched and further depleted particle stream, respectively.

2. The method for removing particle from a particle loaded fluid stream according to claim 1, said method further comprising one or more of the process steps selected from the group consisting of: i) providing a multiplicity of the curved duct systems, positioning in series or in parallel; j) connecting multiple inlet feeds into a common fluid flow balancing void space to ensure that inlet pressures across multiple duct systems are the same; k) connecting multiple outlet feeds into a common duct system outlet fluid stream; l) connecting multiple outlet feeds into a common duct system outlet fluid stream and connecting this to a fluid cyclonic separator; m) connecting multiple outlets of the curved duct systems to a down-stream passive air filtration device; n) connecting multiple outlets of the curved duct system to a down-stream active air filtration device; o) connecting multiple outlets of the curved duct system to a down-stream active air filtration device wherein a filter cassette has movable dust extraction hood to remove ejected contaminants outside of the void space area of the in-coming stream; p) connecting multiple outlets of the curved duct system to a down-stream active filtration device wherein a filter cassette has a movable dust extraction hood to remove ejected contaminants outside of the void space area of the in-coming air stream where the cleaning cycle is supported by an air jet system on the down-stream side of the air stream wherein an optional air storage reservoir exists; q) providing a down-stream variable speed main system fan process which is connected to a vacuum pressure sensor, with before or after or within the multi-vortex air-splitter and adjusting fan speed so as to influence the inlet pressure of the system and as such making fine or coarse adjustments to the speed of the speed main system fan can maintain inlet pressure at a constant which is for many up-stream or down-stream processed an advantage.

3. The method for removing particles from a particle loaded fluid stream according to claim 2, wherein said cyclonic separator comprises a booster fan process for increasing fluid velocity and/or adjusting fluid pressure.

4. The method for removing particles from a particle loaded fluid stream according to claim 1, in a manufacturing environment for producing fast moving consumer good, wherein said fluid is air, and wherein the particle loaded air stream result from pre-processes, one or more selected from the group consisting of: r) a trim suction process step; s) a general process air suction process; t) a conveyor vacuum air stream process; u) a dust control operation vacuum air process; v) a cellulose disintegration process; w) a transfer or laydown process for particulate materials.

5. The method for removing particles from a particle loaded fluid stream according to claim 4, wherein said manufacturing environment is for producing fast moving consumer goods.

6. The method for removing particles from a particle loaded fluid stream according to claim 1, comprising a multiplicity of curved duct systems.

7. The method for removing particles from a particle loaded fluid stream according to claim 1, wherein said curved duct system comprise more than one turn.

8. An apparatus for removing particles from a particle loaded fluid stream, wherein the apparatus comprises: at least one fluid splitter device comprising: —a curved duct system exhibiting a curvature angle of more than 1800, which is adapted to: deflect an incoming particle loaded fluid stream into a rotational movement, and hold the incoming particle loaded fluid stream in a rotary form for a time period allowing particles of the particle loaded fluid stream to accumulate on the outward portion of the rotating fluid stream; —a splitter blade, adapted to separate the outward portion of the rotating fluid stream from the inward portion of the rotating fluid stream whereby the outward portion of the rotating fluid stream is a particle enriched fluid stream, and the inward portion of the rotating fluid stream is a particle depleted fluid stream, relative to an incoming particle loaded fluid stream; —a first duct body adapted to hold and guide the outgoing particle enriched fluid stream; —a second duct body adapted to hold and guide the outgoing particle depleted fluid stream; a cyclonic separator device, connected to the multiplicity of fluid splitter devices by their first duct bodies, such that the particle enriched fluid streams of the fluid splitter devices are fed to the inlet of the cyclonic separator.

9. The apparatus for removing particles from a particle loaded fluid stream according to claim 8, wherein the apparatus comprises one or more elements selected from the group consisting of:
multiple fluid splitter devices being arranged in parallel;
multiple inlet feed ducts to the fluid splitter devices being connected into a common air balancing void space;
multiple outlet feed ducts of the fluid splitter device being combined into a common outlet stream duct adapted to hold and guide a common particle loaded fluid stream;
multiple outlet feed ducts and/or the common particle loaded fluid stream being connected to a fluid cyclonic separator device;
multiple outlet feed ducts of the fluid splitter device and/or the cyclonic separator device being connected to a down-stream passive air filtration device;
multiple outlet feed ducts of the fluid splitter device and/or the cyclonic separator device being connected to a down-stream active air filtration device;
multiple outlet feed ducts of the fluid splitter device and/or the cyclonic separator device being connected to a down-stream active air filtration device wherein a filter cassette has a movable dust extraction hood to remove ejected particles outside of the void space area of the in-coming air stream;
multiple outlet feed ducts of the fluid splitter device and/or the cyclonic separator device being connected to a down-stream active filtration device wherein a filter cassette has a movable dust extraction hood to remove ejected particles outside of the void space area of the in-coming stream where the cleaning cycle is supported be a fluid, preferably an air jet system on the down-stream side of the fluid stream, further optionally comprising a fluid storage reservoir;
a down-stream variable speed main system fan process which is connected to a vacuum pressure sensor, before or after or within the apparatus, whereby the adjusting of the fan speed influences the inlet pressure of the system, and allows for making fine or coarse adjustments to the speed of the speed main system fan so as to maintain the inlet pressure at a constant level, thus providing advantageously stable conditions for up-stream or down-stream processes.

10. The apparatus for removing particles from a particle loaded fluid stream according to claim 9, wherein said common air balancing void space is adapted to ensure that inlet pressures across multiple systems are the same.

11. The apparatus for removing particles from a particle loaded fluid stream according to claim 9, wherein said fluid cyclonic separator device further comprises a booster fan positioned before or after the cyclonic fluid separator device.

12. The apparatus for removing particles from a particle loaded fluid stream according to claim 8, comprising a multiplicity of fluid splitter devices.

13. The apparatus for removing particles from a particle loaded fluid stream according to claim 8, wherein the curved duct system comprises more than one turn.

14. The apparatus for removing particles from a particle loaded fluid stream according to claim 8, wherein said fluid splitter device comprises a curved duct system exhibiting a curvature angle of more than 180°.

* * * * *